(12) United States Patent
Skaff et al.

(10) Patent No.: US 8,120,478 B2
(45) Date of Patent: Feb. 21, 2012

(54) VEHICLE INFORMATION DISPLAY AND METHOD

(75) Inventors: Ryan J. Skaff, Farmington Hills, MI (US); Derek Hartl, Royal Oak, MI (US); Angela L. Watson, Ann Arbor, MI (US); David Watson, Ann Arbor, MI (US); Paul Stephen Bryan, Belleville, MI (US); John Shutko, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 375 days.

(21) Appl. No.: 12/425,620

(22) Filed: Apr. 17, 2009

(65) Prior Publication Data

US 2010/0265050 A1 Oct. 21, 2010

(51) Int. Cl.
*B60Q 1/00* (2006.01)
(52) U.S. Cl. ........ 340/438; 340/439; 340/441; 340/461; 701/29

(58) Field of Classification Search .................. 340/438, 340/439, 441, 442, 449, 450, 455, 457, 457.1, 340/457.2, 457.3, 457.4, 461, 984; 701/29, 701/30, 31, 33, 36; 903/902
See application file for complete search history.

(56) References Cited

U.S. PATENT DOCUMENTS

| 5,487,002 | A | 1/1996 | Diller et al. |
| 5,623,194 | A | 4/1997 | Boll et al. |
| 6,078,853 | A | 6/2000 | Ebner et al. |
| 7,013,205 | B1 | 3/2006 | Hafner et al. |
| 7,609,152 | B2 * | 10/2009 | Crowe et al. ................. 340/461 |
| 7,796,019 | B2 * | 9/2010 | Yamada ........................ 340/438 |
| 2006/0185917 | A1 | 8/2006 | Ozeki et al. |

* cited by examiner

*Primary Examiner* — Anh V La
(74) *Attorney, Agent, or Firm* — Jennifer M. Stec; Brooks Kushman P.C.

(57) ABSTRACT

An information display system for a hybrid electric vehicle configured to display one or more reasons an engine is on is provided. The information display system determines which engine on reasons are true and applies a prioritization strategy to determine which engine on reasons are displayed to an operator via an information display.

20 Claims, 4 Drawing Sheets

| RANK | ENGINE ON REASON | EXPLANATION |
|---|---|---|
| 1 | NEUTRAL GEAR | Engine is on because vehicle is in neutral gear. Shift out of neutral gear to return to electric mode. |
| 2 | LOW GEAR | Engine is on because vehicle is in LOW gear. Shift out of low gear to return to electric mode. |
| 3 | HIGH SPEED | Engine is on because vehicle speed exceeds the level for electric mode operation. Reduce speed to return to electric mode. |
| 4 | HEATER SETTING | Engine is on because of heater setting. Reduce or shut off heater setting to return to electric mode. |
| 5 | ENGINE COLD | Engine is on to warm-up. Vehicle will return to electric mode when engine is warm. |
| 6 | BATTERY CHARGING | Engine is on to charge the hybrid battery. Vehicle will return to electric mode once battery is charged. |
| 7 | ACCELERATION | Engine is on because of pressure applied to accelerator pedal. Reduce pressure to the accelerator pedal to return to electric mode. |
| 8 | NORMAL OPERATION | Engine is on to optimize vehicle operation. Vehicle will return to electric mode when possible. |

Fig. 4

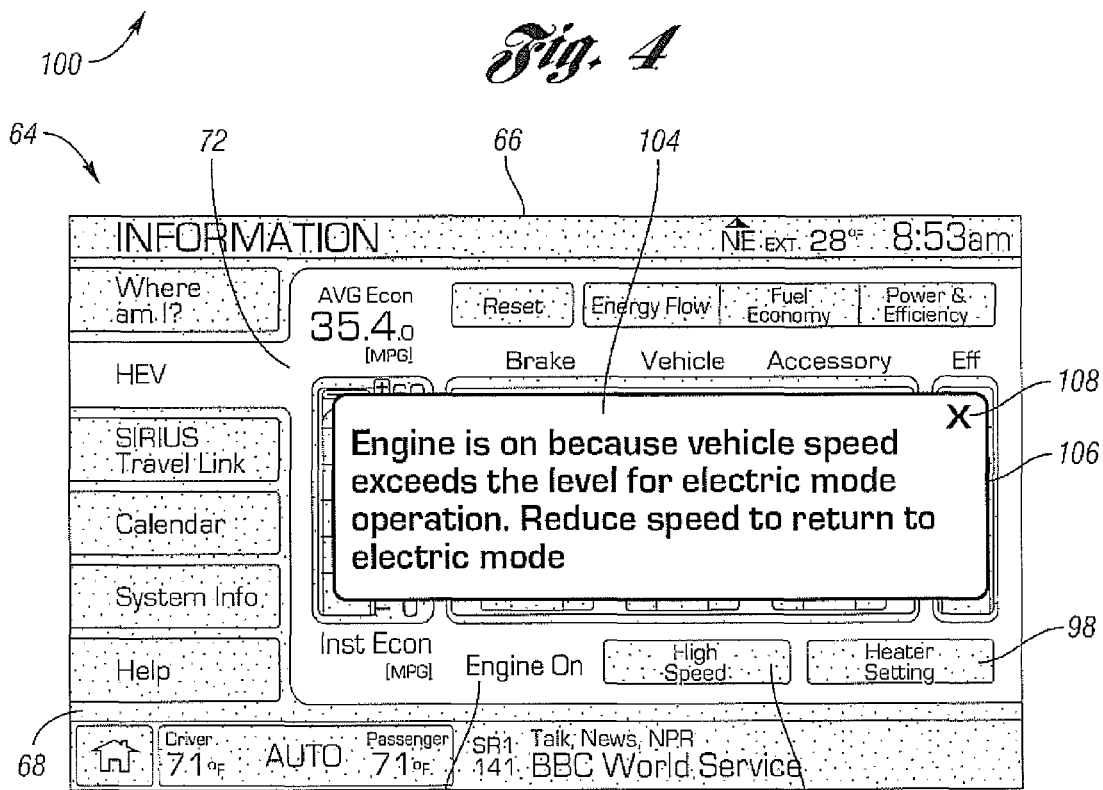

Fig. 5

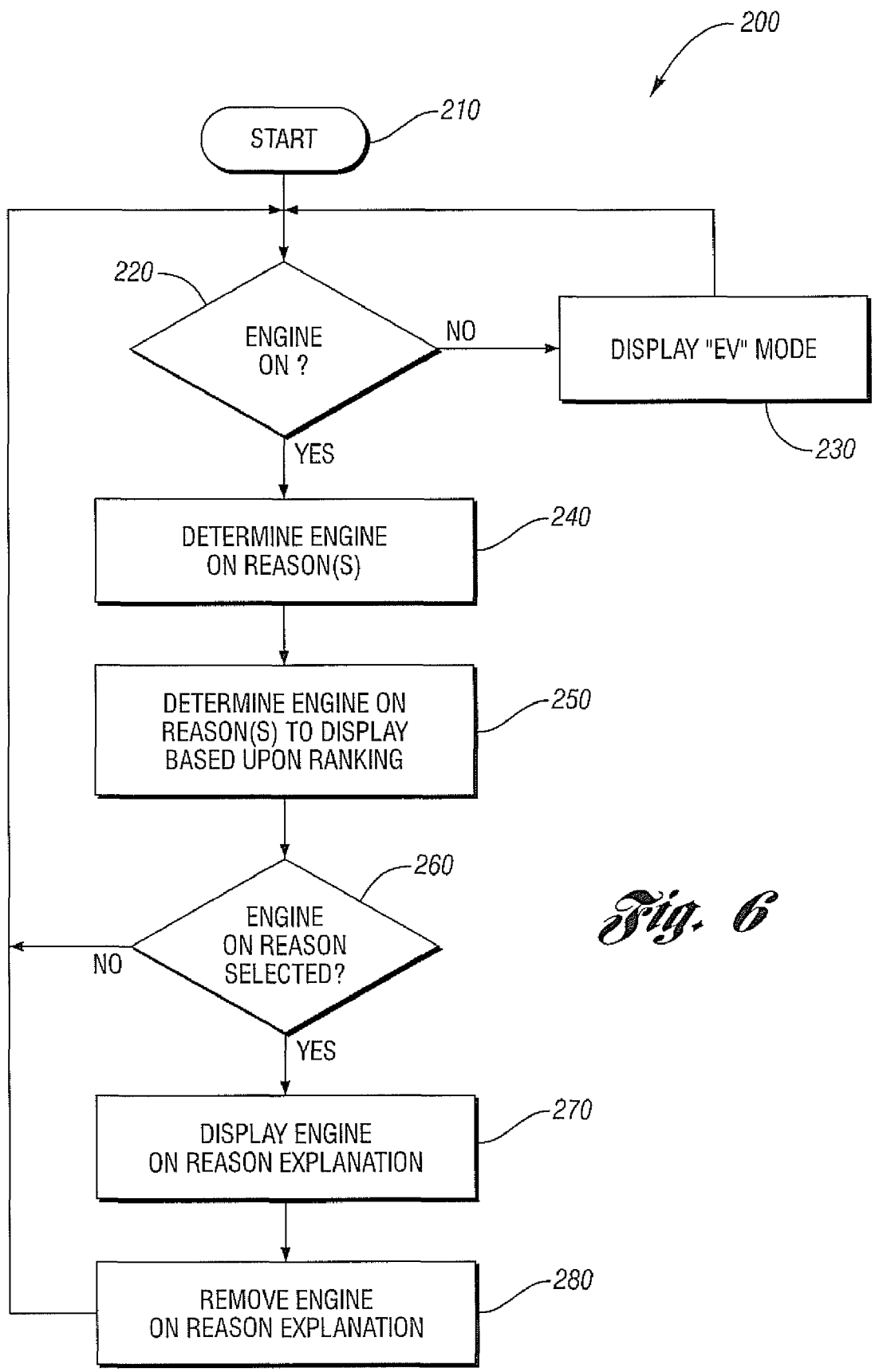

VEHICLE INFORMATION DISPLAY AND METHOD

TECHNICAL FIELD

The following relates to an information display system and method for displaying information relating to the operation of a hybrid electric vehicle (HEV) and, more particularly, to a system and method for conveying to an operator one or more of the reasons an engine of the HEV is on at a given moment in time.

A detailed description and accompanying drawings are set forth below.

BRIEF DESCRIPTION OF THE DRAWINGS

FIG. 4 is a simplified, exemplary table showing several engine on reasons and their associated explanation according to a display ranking in accordance with an embodiment of the present application;

FIG. 5 is a simplified, exemplary diagram depicting the information display system displaying an explanation of an engine on reason according to an embodiment of the present application; and FIG. 6 is a simplified, exemplary flowchart depicting a methodology according to one or more embodiments of the present application.

DETAILED DESCRIPTION

With reference to FIGS. 1-6, a more detailed description of embodiments of the system and method and various components thereof will now be provided.

All vehicles, whether passenger or commercial, include a number of gauges, indicators, and various other displays to provide the vehicle operator with information regarding the vehicle and its surroundings. With the advent of new technologies, such as hybrid electric vehicles (HEVs), has come a variety of new gauges and information displays that help drivers to better learn the operation of these vehicles that utilize new technology. For example, many HEVs incorporate gauges that attempt to provide the driver with information on the various hybrid driving states. For example, some gauges will indicate to the driver when the vehicle is being propelled by the engine alone, the motor alone, or a combination of the two. Similarly, a display may indicate when the motor is operating as a generator, and is recharging an energy storage device, such as a battery.

With regard to HEVs, it is known that some drivers may not be able to achieve desired fuel economy numbers, in part because of driving habits. In many cases, drivers are willing to modify their behavior, but are unable to translate recommended techniques into real changes in their driving habits. Moreover, gauges or displays that merely indicate when the engine is on or off, provide information that is not timely—i.e., once the indicator signals that the engine is on, it is too late for the driver to modify his or her driving to keep the engine off. Further, these gauges or displays fail to indicate why the engine is on in the first place.

With the advent of sensing electronics, computers and other vehicle related technology, the amount of vehicle information that can be communicated to the driver is virtually limitless. Often, the driver may not even know of all the features and capabilities their vehicles have to offer. Displaying certain types of information, particularly information relevant to HEVs, can help facilitate economical driving choices by a driver.

However, there is often a learning curve associated with the various informative content available to a driver. This learning curve may be exacerbated as drivers are introduced to more advanced vehicle technologies, capabilities and features, particularly with respect to HEVs. Displaying much of the vehicle information available to a driver can be overwhelming, particularly information designed to influence driving habits.

Therefore, a need exists for an information display for a vehicle, and a method for displaying such information, that provides content that will help a driver increase fuel economy and other energy efficiencies. Particularly, a need exists for conveying information regarding the operation of an HEV, such as the specific reasons that cause the engine to come on and what a driver can do to enable the engine to turn off.

Figure 1:
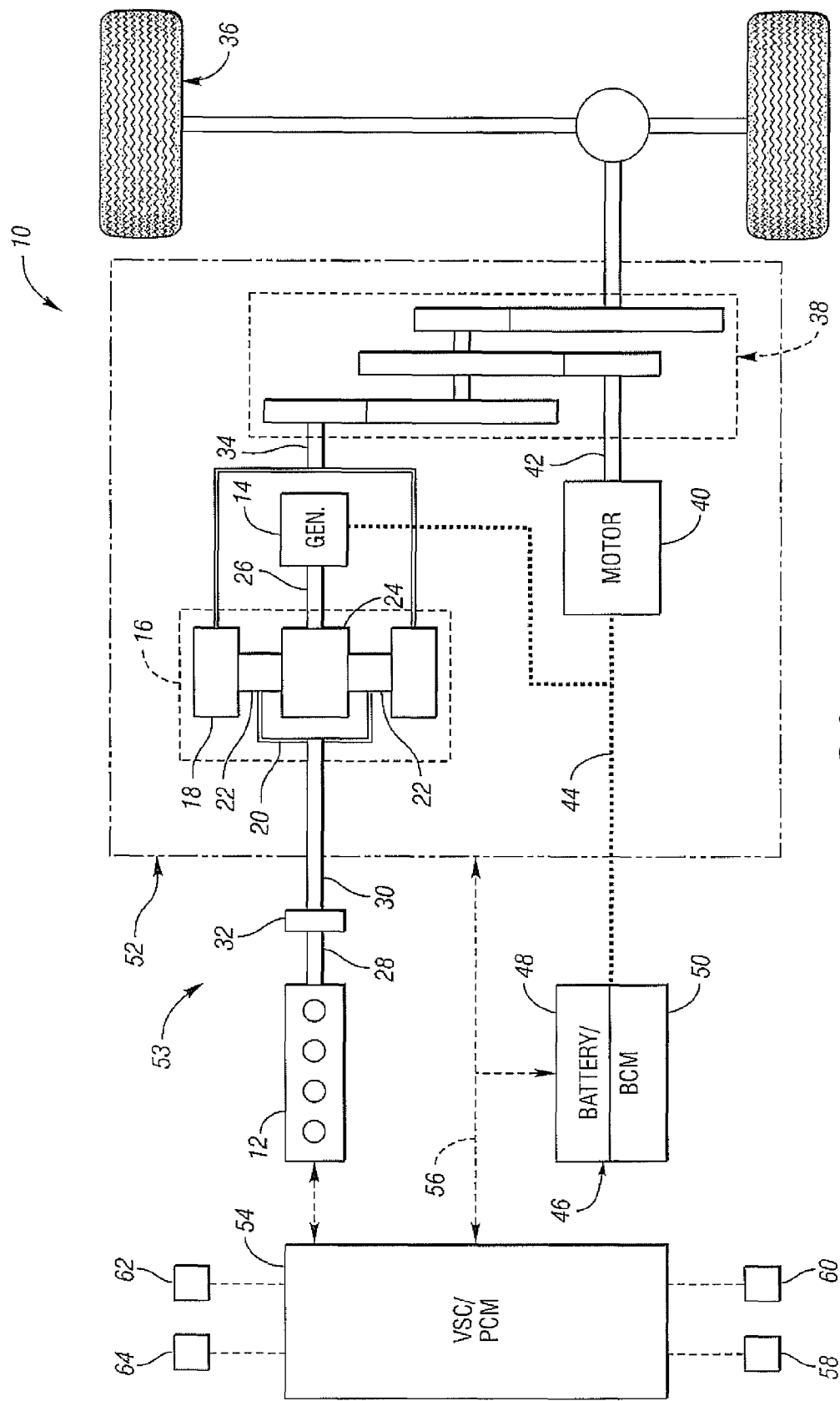
FIG. 1 is a simplified, exemplary schematic representation of a hybrid electric vehicle (HEV) including an information display system according to one or more embodiments of the present application.

Referring now to the drawings, FIG. 1 is a simplified, exemplary schematic representation of a vehicle 10, which includes an engine 12 and an electric machine, or generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement—i.e., the motor 40 and the generator 14—can both be used as motors to output torque. Alternatively, each can also be used as a generator, outputting electrical power to a high voltage bus 44 and to an energy storage system 46, which includes a battery 48 and a battery control module (BCM) 50.

The battery 48 is a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52—i.e., the generator 14 and motor 40—a vehicle control system, shown generally as controller 54, is provided. As shown in FIG. 1, the controller 54 is a vehicle system controller/powertrain control module (VSC/PCM). Although it is shown as a single controller, it may include multiple controllers. For example, the PCM portion of the VSC/PCM 54 may be software embedded within the VSC/PCM 54, or it can be a separate hardware device.

A controller area network (CAN) 56 allows the VSC/PCM 54 to communicate with the transmission 52 and the BCM 50. Just as the battery 48 includes a BCM 50, other devices controlled by the controller 54 may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present application. Although illustrated and described in the context of the vehicle 10, which is an HEV, it is understood that embodiments of the present application may be implemented on other types of vehicles.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, communicate with the controller 54.

The air conditioning system 62 also communicates with the controller 54. The on/off status of the air conditioning system can be communicated to the controller 54, and can be based on, for example, the status of an operator actuated switch, or the automatic control of the air conditioning system 62 based on related functions such as window defrost. In addition to the foregoing, the vehicle 10 may include an information display system 64, which, as explained in detail below, provides vehicle content to an operator of the vehicle 10.

Figure 2:
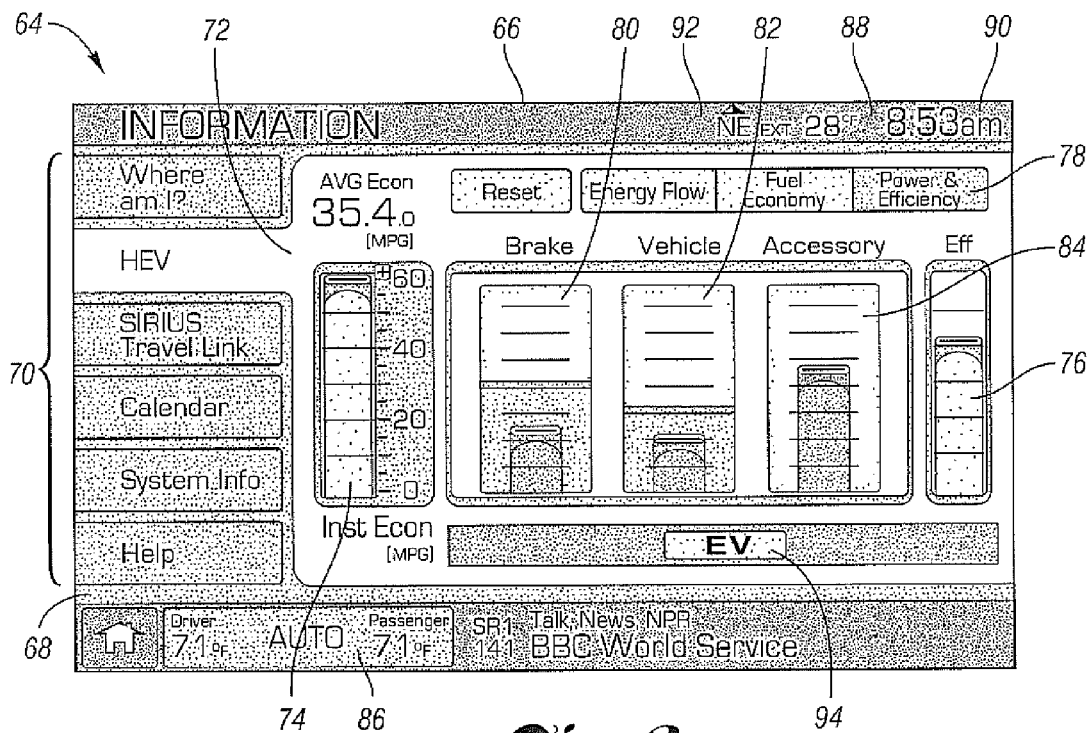
FIG. 2 is simplified, exemplary diagram depicting the information display system when an HEV is in an electric vehicle (EV) mode according to one or more embodiments of the present application.

Referring now to FIG. 2, the information display system 64 according to one or more embodiments of the present application is shown in greater detail. The information display system may include its own control module (not shown) in communication with the controller 54 or may directly interface with the controller 54 for purposes of employing the various aspects of the present application. The information display system 64 may include an information display 66. The information display 66 may be disposed within a dashboard (not shown) of the vehicle 10, such as in an instrument panel or center console area. The information display 66 may be part of another display system, such as a navigation display system, or may be part of a dedicated information display system. The information display 66 may be a liquid crystal display (LCD), a plasma display, an organic light emitting display (OLED), or any other suitable display. The information display 66 may include a touch screen 68 for receiving driver input associated with selected areas of the information display 66. The information display system 64 may also include one or more buttons (not shown), including hard keys or soft keys, located outside of the information display 66 for effectuating driver input. Other operator inputs known to one of ordinary skill in the art may also be employed without departing from the scope of the present application.

As shown in FIG. 2, the information display 66 may be configured to display one or more selectable display pages 70, such as a navigation page, an HEV page, a stereo page, or the like. A selected display page may be referred to as an active page 72. As shown in FIG. 2, the HEV page may be the active page. The HEV page may display content relating to the operation of a hybrid electric vehicle, such as vehicle 10. As seen therein, the information display 66 may include one or more vehicle gauges. For example, the information display 66 may include an instantaneous fuel economy gauge 74 and an overall energy efficiency gauge 76. Moreover, the information display 66 may include driver-selectable gauges or sets of gauges 78, such as gauges relating to "Power & Efficiency" of the HEV. In this regard, the information display 66 may include a brake demand gauge 80, a vehicle demand gauge 82 and an accessory load gauge 84. The information display 66 may also provide additional content, such as climate control information 86, ambient temperature 88, time 90, and a compass 92.

As shown in FIG. 2, the information display system 64 may include an electric vehicle (EV) mode indicator 94. The EV mode indicator 94 may be a display icon, indicator light, or the like. Moreover, the EV mode indicator 94 may be displayed (or activated) via the information display 66 when the engine 12 of the vehicle 10 is off. Accordingly, the EV mode indicator 94 can convey the state of the HEV to the operator. If the EV mode indicator 94 is displayed, or is otherwise active, the operator may understand that the engine 12 is off and that the vehicle 10 is in the EV mode. If the EV mode indicator 94 is not displayed, or is otherwise inactive, the operator may understand that the engine 12 is on.

Figure 3:
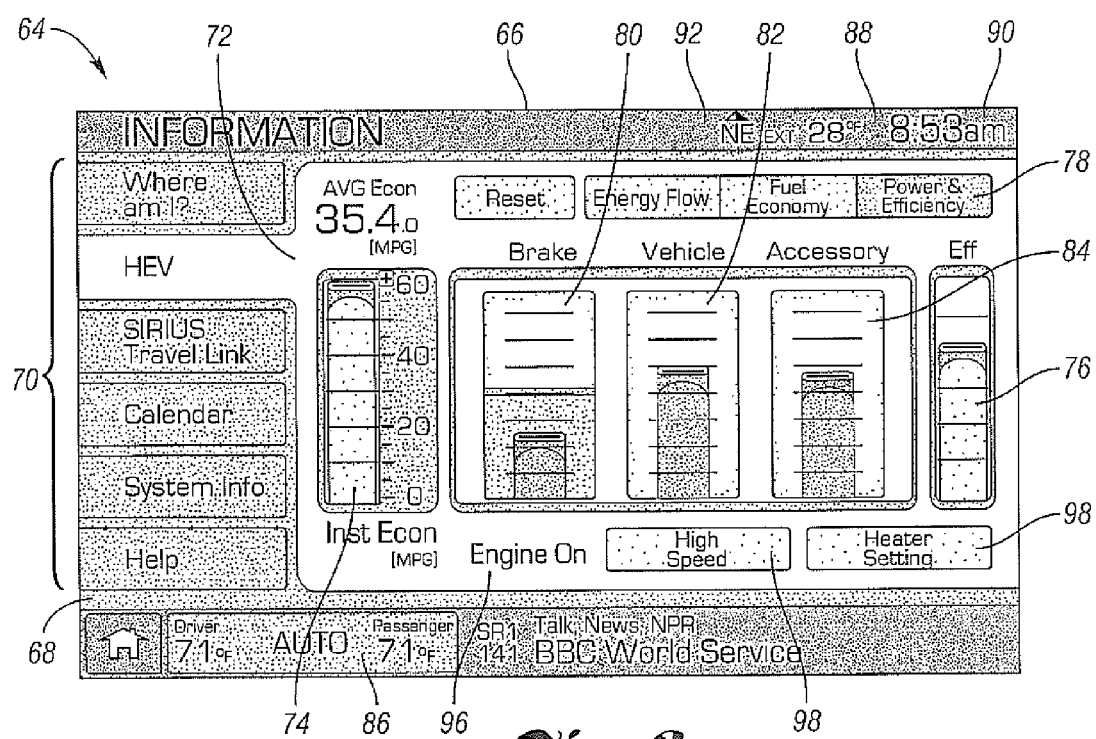
FIG. 3 is a simplified, exemplary diagram depicting the information display system when the HEV is not in the EV mode according to one or more embodiments of the present application.

Referring now to FIG. 3, wherein like reference numerals represent like elements, an exemplary embodiment of the information display system 64, including the information display 66, when the engine 12 of vehicle 10 is on is shown. As seen therein, rather than displaying the EV mode indicator 94, the information display 66 may include an engine on indicator 96. In addition to the engine on indicator 96, the information display 66 may also include iconography corresponding to one or more of a plurality of engine on reasons 98. As shown in FIG. 2, two engine on reasons may be displayed (e.g., "High Speed" and "Heater Setting"). However, greater than or fewer than two engine on reasons may be displayed without departing from the scope of the present application.

HEV operation and control strategy can be extremely complex and may include as many as 30, 40 or even more vehicle system events, states or other items that cause an engine to either start, stop, remain on, or remain off. Items that trigger the engine 12 to start may be referred to as engine pull-up requests. Items that trigger the engine 12 to stop may be referred to as engine pull-down requests. Items that cause the engine 12 to remain on, if already on, may be referred to as inhibit pull-down requests. Finally, items that cause the engine 12 to remain off, if already off, may be referred to as inhibit pull-up requests. According to one or more embodiments of the present application, a strategy may be employed to filter the 30 or more items and categorize, or otherwise group, them into a reasonable number that can be both easily understood and readily discernable by a typical operator of the vehicle 10.

According to the strategy, the entire set of items that affect engine operation may be filtered by eliminating the engine pull-down and inhibit pull-up requests. Thus, items that cause the engine to stop or items that prevent the engine from turning on may be ignored. The remaining engine pull-up and inhibit pull-down requests, referred to collectively as "engine on causes," may then be categorized into more general groups. Each group may be associated with one of the plurality of engine on reasons 98. Accordingly, each engine on reason 98 may therefore be associated with one or more engine on causes. For example, an engine on cause related to reverse vehicle speed and an engine on cause related to forward vehicle speed may both be engine on causes associated with a "High Speed" engine on reason. The title of each engine on reason (e.g., "High Speed" and "Heater Setting") may be selected so that the operator can easily understand why the vehicle's engine is on instead of conveying complex engineering terms that some operators may have difficulty comprehending.

Several engine on reasons 98 may be present or "true" at any given moment when the engine 12 of the vehicle 10 is on. However, according to an embodiment of the present application, it may be desirable to limit the number of engine on reasons displayed by the information display 66 for the sake of simplicity, due to space constraints, or the like. Accordingly, a prioritization strategy may be applied to the plurality of engine on reasons 98. The prioritization strategy may determine which of the plurality of engine on reasons 98 are displayed. Moreover, if more than one engine on reason 98 can be displayed, the prioritization strategy may determine the order in which each engine on reason 98 is displayed, if more than one engine on reason 98 is true.

A general overview of an exemplary prioritization strategy that may be employed is described below. It should be noted, however, that other strategies for prioritizing which engine on reason(s) 98 are displayed may be employed without departing from the scope of the present application. For example, the engine on reason(s) 98 given the highest priority for display may be based upon items the driver has direct control over and do not change frequently. This reasoning is two-fold. Displaying an engine on reason that the driver has some degree of control over may encourage the driver to modify a behavior in order to get the engine 12 to turn off. Moreover, engine on reasons that do not frequently change when the engine 12 is on can reduce the busyness of the information display 66 by minimizing the amount of rapidly changing content.

The next level of priority may be based upon engine on reason(s) 98 that the driver has control over and are true most often when the engine 12 is on. This may also cause the information display 66 to update less frequently, thereby minimizing the busyness of the information display 66. Next, priority may be given to the engine on reason(s) 98 that are most easily understood by typical drivers, but aren't necessarily items the driver can control. Examples may be engine on reasons related to the engine system being too cold or the battery state of charge being low. The engine on reason(s) 98 meeting this criterion may be further prioritized based upon items that are true most often.

The next level of priority may be given to any remaining engine on reason(s) 98 that tend to change more frequently. Within this level, driver controllable items should be given the highest priority. An example may be acceleration demand. Finally, an engine on reason category (e.g., "Normal Operation") may be provided for engine on causes that most drivers would not necessarily understand and/or various engineering modes that require the engine to be on.

FIG. 4 shows an exemplary table 100 of the plurality of engine on reasons 98. A display ranking 102 may be given to each engine on reason 98 based upon the prioritization strategy. An engine on reason listed in the table 100 may be displayed before another engine on reason that is listed below it, assuming both reasons are true at a given moment. For example, if at a given moment, the engine 12 is on and more than one engine on reason is true, then the engine on reason with the highest display ranking 102 (lowest number in FIG. 4) will be displayed first. If only one engine on reason is to be displayed on the information display 66, then the highest ranking engine on reason is displayed. If the information display system 64 is configured to display two engine on reasons, for example, then the top two engine on reasons according to their display ranking 102 may be displayed. The order in which the top two engine on reasons are displayed on the information display 66 may also be affected by the display ranking 102. Since a higher priority engine on reason, according to the display ranking, may become true when a lower priority engine on reason is already displayed, the lower priority reason shall shift or be removed from the information display 66 in order to show the higher priority reason first. The same logic can be applied for information display systems configured to display more than two engine on reasons.

The information display 66 in FIG. 3 can provide an example of how the prioritization strategy may be implemented. For example, at a given moment in time, the engine 12 may be on and three engine on reasons 98 may be true. For instance, the engine 12 may be on due to "High Speed," "Heater Setting," and "Battery Charging" engine on reasons being true. As shown in FIG. 3, the information display system 64 may be configured to display only two engine on reasons at a time. Accordingly, the "High Speed" and "Heater Setting" engine on reasons may be displayed by the information display 66 since they are listed above the "Battery Charging" engine on reason in the table 100 of FIG. 4. Moreover, the "High Speed" engine on reason may be shown to the left of the "Heater Setting" engine on reason on the information display 66 since it has a higher display ranking. If a higher priority engine on reason such as "Neutral Gear" becomes true while the others remain true, then the "High Speed" engine on reason may be shifted to the right replacing the "Heater Setting" engine on reason. The "Neutral Gear" engine on reason may be displayed where the "High Speed" engine on reason previously existed. The "Heater Setting" engine on reason may be removed from the display altogether.

Because of the unique operating characteristics of an HEV, some special cases for the plurality of engine on reasons 98 may exist. These special cases may be accounted for in the logic that determines which engine on reasons, if any, to display. For example, one consideration that may be taken into account into the control logic may be to prevent the "Heater Setting" engine on reason from displaying if the vehicle's climate control head unit is off. This is because the operator may not be able to affect the climate setting if the climate control head unit is off and may be cause for operator confusion.

As another example, a calibrateable accelerator pedal threshold may be employed requiring the accelerator pedal 60 to be pressed beyond the threshold in order for the "Acceleration" engine on reason to be displayed. In many instances, an alternate, but applicable, engine on reason 98 may be displayed instead. Specifically, certain engine on causes within in the "Acceleration" engine on reason category may drive what is specifically displayed by the information display 66 in the event the certain engine on cause is true when the accelerator pedal 60 is not pressed beyond the threshold. For instance, if the "Acceleration" engine on reason is true because a "total power" engine pull-up request is true due to low discharge power, then the information display system 64 may be programmed to display the "Normal Operation" engine on reason instead if the accelerator pedal 60 is not pressed beyond the threshold. Alternately, if the "Acceleration" engine on reason is true because the "total power" engine pull-up request is true due to the battery state of charge, then the information display system 64 may be programmed to display the "Battery Charging" engine on reason instead if the accelerator pedal 60 is not pressed beyond the threshold.

Other examples may include masking the display of the "High Speed" engine on reason when the vehicle 10 is in low gear, displaying only the "Neutral Gear" engine on reason when the vehicle 10 is in neutral at a low vehicle speed, and preventing the display of the "Acceleration" engine on reason if the "High Speed" engine on reason is true.

The special logic considerations described above are merely exemplary. Other considerations may be taken into account depending upon various design considerations, requirements, and constraints. Moreover, the strategy employed to assign specific engine on causes into the various engine on reason categories may affect these considerations.

Since the reasons that cause the engine 12 to be on may constantly change, the information display system 64 of the present application may continuously monitor other vehicle systems and conditions and update the information display 66 accordingly. Should the engine 12 of vehicle 10 turn off, the information display 66 may update by displaying the EV mode indicator 94.

The table 100 of FIG. 4 also provides a column containing a brief explanation 104 associated with each engine on reason 98. According to one or more embodiments of the present application, the explanation 104 associated with a specified engine on reason 98 may also be displayed as text by the information display 66. For example, at a given moment when a particular engine on reason is being displayed, an operator may select an input device that corresponds to the particular engine on reason. The input device may be a region of the touch screen 68 where the engine on reason is displayed. Alternatively, the input device may be a button provided adjacent the information display 66. If an operator selects a particular engine on reason 98, the associated explanation 104 for the engine on reason may appear on the information display 66.

Referring to FIG. 5, the engine on reason explanation 104 may appear in a pop-up text block 106 over the active page 72. The pop-up text block 106 may remain for a predetermined period of time or may remain indefinitely. For example, the pop-up text block 106 may include a "close" icon 108. If a region of the touch screen 68 at or near the close icon 108 is touched, the pop-up text block 106 may disappear and the information display 66 may return to the active page 72. Alternatively or additionally, the operator may cause the pop-up text block 106 to disappear by touching anywhere on the touch screen 68, by selecting a button adjacent the information display 66, or the like.

It should be noted that the engine on reasons 98 shown in the table 100 of FIG. 4 are merely exemplary. In this regard, more or less engine on reasons 98 may be provided without departing from the scope of the present application. Moreover, the specific engine on reasons may differ as well as their corresponding labels and explanations. Finally, as previously discussed, the display ranking 102 assigned to each engine on reason 98 may be altered depending upon the specific prioritization strategy employed.

FIG. 6 depicts a simplified, exemplary method 200 according to one or more embodiments of the present application. Step 210 provides an entry to the method. At step 220, the system may determine whether or not the engine 12 of the vehicle 10 is on. If it is determined that the engine 12 is not on, the method may proceed to step 230. At step 230, the system may cause the EV mode indicator 94 to be displayed on the information display 66. This can provide confirmation to the operator that the vehicle 10 is operating in the EV mode. Thereafter, the method may return to step 220 and continue to monitor the operating mode of the vehicle 10. On the other hand, if it is determined at step 220 that the engine 12 is on, the method may proceed to step 240. At step 240, the system may determine the reason or reasons causing the engine 12 to be on, i.e., the engine on reasons 98. As previously discussed, each general engine on reason 98 may be associated with one or more specific engine on causes. If an engine on cause is true within a given engine on reason category, then the associated engine on reason 98 may also be true. Once the engine on reasons 98 that are true are identified, the system may determine which engine on reason(s) 98 to display and, if more than one reason can be displayed and more than one reason exists, in what order the engine on reasons 98 are to be displayed, as provided at step 250. As previously discussed, a prioritization strategy may be employed and applied to the engine on reasons 98. The engine on reasons 98 that are true may then be displayed according to their display ranking 102 as determined by the prioritization strategy.

According to one or more embodiments of the present application, the controller 54 may be able to properly sort an prioritize the engine on reasons 98. In such instances, an interface between the controller 54 and the information display 66 may be employed so that the information display 66 can process a simple input and display accordingly. For example, an interface may be employed having an engine on reason display command for each engine on reason 98 to be displayed on the information display 66. If three engine on reasons are to be displayed, then three interface signals can be defined. The controller may employ an algorithm to determine the top three engine on reasons for display purposes and may send only one engine on reason display command on each interface signal. It should be noted that other interface strategies may be employed without departing from the scope of the present application. For instance, if a display control module is used, the display control module may implement the prioritization strategy and map the engine on reasons 98 to be displayed to appropriate interface signal(s) in communication with the information display 66.

Steps 240 and 250 may also take into account any special cases in which the display of a particular engine on reason is masked even if true due to other system considerations or logic scenarios as previously described herein.

Once the applicable engine on reason(s) 98 are displayed on the information display 66, the method may proceed to step 260. At step 260, the system may determine whether a particular engine on reason 98 has been selected by an operator at the information display 66. For example, the information display system 64 may receive driver input corresponding to a particular engine on reason. The driver input may be the result of a driver selecting a defined area of the touch screen 68 or a button adjacent the information display 66. If it is determined that a particular engine on reason has not been selected, the method may loop back to step 210 and start over.

If, however, it is determined at step 260 that a particular engine on reason has been selected, the method may proceed to step 270.

At step 270, the system may display the corresponding engine on reason explanation 104, as provided in FIG. 4. An example is shown in FIG. 5 in which the engine on reason explanation 104 may appear as text in a pop-up text block 106. Thereafter, the method may proceed to step 280. At step 280, the engine on reason explanation 104 may disappear from the information display 66. As described with respect to FIG. 5, the operator may prompt the pop-up text block 106 to disappear or it may be removed from the information display 66 automatically after a predetermined period of time. After the pop-up text block 106 has been removed from the information display 66, the method may return to step 210 and continue to monitor the state of the engine 12 and, if the engine is on, the reasons why the engine is on. In this regard, the information display 66 may be continually updated to display the relevant engine on reason or reasons 98 according to their respective display ranking 102.

It should be noted that the method of FIG. 6 as described herein is exemplary only, and that the functions or steps of the methods could be undertaken other than in the order described and/or simultaneously as may be desired, permitted and/or possible.

While the best mode for carrying out the invention has been described in detail, those familiar with the art to which this invention relates will recognize various alternative designs and embodiments for practicing the invention as defined by the following claims.

What is claimed is:

1. A display system for a hybrid electric vehicle (HEV) comprising:
   an information display configured to display at least one of a plurality of engine on reasons, each of the plurality of engine on reasons having a display ranking; and
   a controller configured to receive input corresponding to at least one of the plurality of engine on reasons and transmit at least one output so that the information display displays the at least one engine on reason based at least in part upon the display ranking.

2. The system of claim 1, wherein the at least one of the plurality of engine on reasons is displayed when the engine is on.

3. The system of claim 1, wherein the display ranking determines which of the at least one of the plurality of engine on reasons are displayed and in what order the at least one of the plurality of engine on reasons are displayed.

4. The system of claim 3, wherein the display ranking of each of the plurality of engine on reasons is based at least in part upon whether the driver has direct control over the engine on reason.

5. The system of claim 4, wherein the display ranking of each of the plurality of engine on reasons is based at least in part upon the frequency with which the engine on reason changes.

6. The system of claim 5, wherein the display ranking of each of the plurality of engine on reasons is based at least in part upon which engine on reasons are true most often.

7. The system of claim 6, wherein the display ranking of each of the plurality of engine on reasons is based at least in part upon a predetermined complexity of an engine on explanation associated with the engine or reason.

8. The system of claim 1, wherein each of the plurality of engine on reasons is associated with an engine on explanation.

9. The system of claim 8, wherein the controller is further configured to:
   receive at least one driver input corresponding to a selected one of the plurality of engine on reasons; and
   transmit at least another output so that the information display displays the engine on explanation associated with the selected one of the plurality of engine on reasons.

10. A display method for a hybrid electric vehicle comprising:
    receiving input corresponding to at least one engine on cause;
    selecting a number of engine or reasons associated with the at least one engine on cause; and
    displaying at least one of the number of selected engine on reasons on an information display based at least in part upon a display priority ranking.

11. The method of claim 10, further comprising:
    receiving input corresponding to a user selection of one of the displayed engine on reasons; and
    displaying an engine on explanation associated with the engine on reason selected by the user.

12. The method of claim 10, wherein the input corresponding to the at least one engine on cause is received when the engine is operating.

13. The method of claim 10, wherein the number of selected engine on reasons are selected from a plurality of engine on reasons associated with a plurality of engine on causes, and each of the plurality of engine on reasons has an associated display priority ranking.

14. The method of claim 13, wherein the display priority ranking determines which of the number of selected engine on reasons are displayed and in what order the number of selected engine on reasons are displayed.

15. The method of claim 14, wherein the display priority ranking of each of the plurality of engine on reasons is based at least in part upon whether the driver has direct control over the engine on reason.

16. The method of claim 15, wherein the display priority ranking of each of the plurality of engine on reasons is based at least in part upon the frequency with which the engine on reason changes.

17. The method of claim 16, wherein the display priority ranking of each of the plurality of engine on reasons is based at least in part upon which engine on reasons are true most often.

18. The method of claim 13, further comprising:
    displaying a default engine on reason when the engine is on and none of the plurality of engine on reasons are true.

19. A system for displaying information regarding the operation of a hybrid electric vehicle (HEV), the system comprising:
    an information display configured to display at least one of a plurality of engine on reasons, each of the plurality of engine on reasons assigned a display priority ranking and associated with one or more engine on causes; and
    a controller configured to:
    receive input corresponding to at least one of the plurality of engine on causes;
    select a number of engine on reasons, from the plurality of engine on reasons, associated with the at least one engine on cause; and
    transmit a signal causing the information display to display the number of selected engine on reasons based at least in part upon the display priority ranking.

20. The system of claim 19, wherein the display priority ranking determines which of the number of selected engine on reasons are displayed and in what order the number of selected engine on reasons are displayed.

* * * * *